United States Patent [19]

Leader et al.

[11] Patent Number: 4,473,432
[45] Date of Patent: Sep. 25, 1984

[54] DOT HEAT STAPLING

[76] Inventors: Harold Leader; Doris Leader, both of County Rd. 416, Shelby County, Wilsonville, Ala. 35186

[21] Appl. No.: 463,714
[22] Filed: Feb. 4, 1983
[51] Int. Cl.³ .......................... B30B 3/02; B30B 15/34
[52] U.S. Cl. .................................. 156/582; 156/380.6; 156/553; 156/580.1; 156/583.1
[58] Field of Search ....................... 156/88, 73.1, 73.4, 156/253, 272.8, 274.4, 275.1, 290, 308.4, 380.6, 380.7, 553, 580.1, 580.2, 583.1, 582; 428/225, 245

[56] References Cited

U.S. PATENT DOCUMENTS

| | | | |
|---|---|---|---|
| 3,115,564 | 12/1963 | Stacy | 156/290 |
| 3,486,957 | 12/1969 | Fish et al. | 156/88 |
| 3,558,381 | 1/1971 | Colianni | 156/253 |
| 3,758,371 | 9/1973 | Lang et al. | 156/290 |
| 3,765,974 | 10/1973 | Petersik et al. | 156/290 |
| 4,227,959 | 10/1980 | Brown | 156/580.2 |
| 4,373,979 | 2/1983 | Planeta | 156/290 |

Primary Examiner—Michael G. Wityshyn
Attorney, Agent, or Firm—Sherman Levy

[57] ABSTRACT

Dot Hot Stapling is provided wherein articles such as bags can be made of interwoven or knitted plastic material and wherein the interfitting or interwoven strips are adapted to be sealed together so as to prevent unraveling and to provide an economical method of making such articles. With the present invention, crossing points of tape type fabrics are attached together with dot sealing or dot hole edge sealing by any means that will accomplish this function. The dot heat sealing may be accomplished in any of plurality of ways such as by using heated needles, co-acting rollers with heated prongs, pulsed laser, interrupted heated air jets, a pulsed spark arrangement, intermittent ultrasound, ultrasonics, or the like.

1 Claim, 18 Drawing Figures

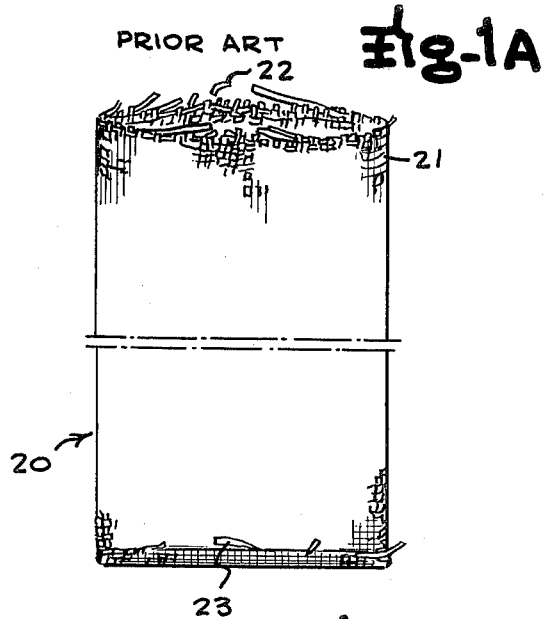
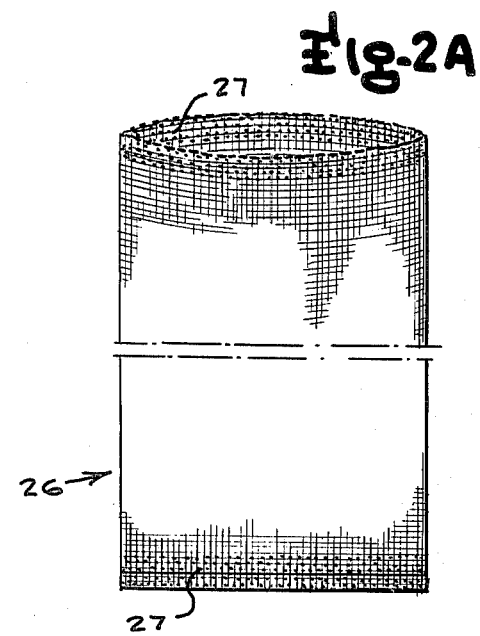
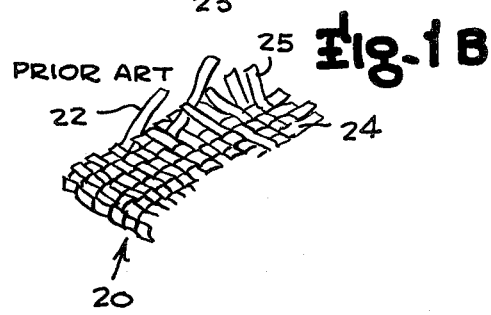
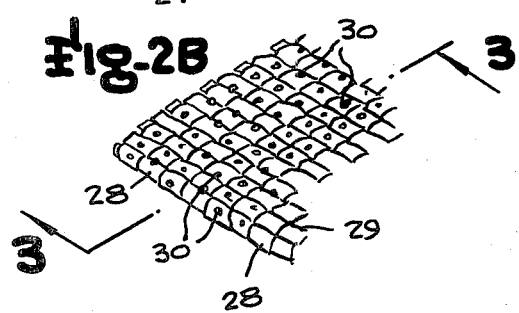
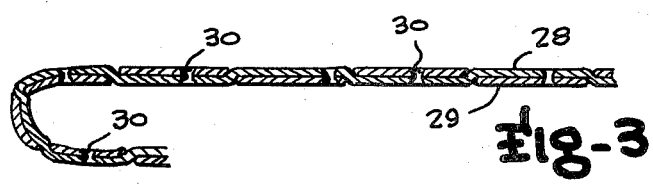
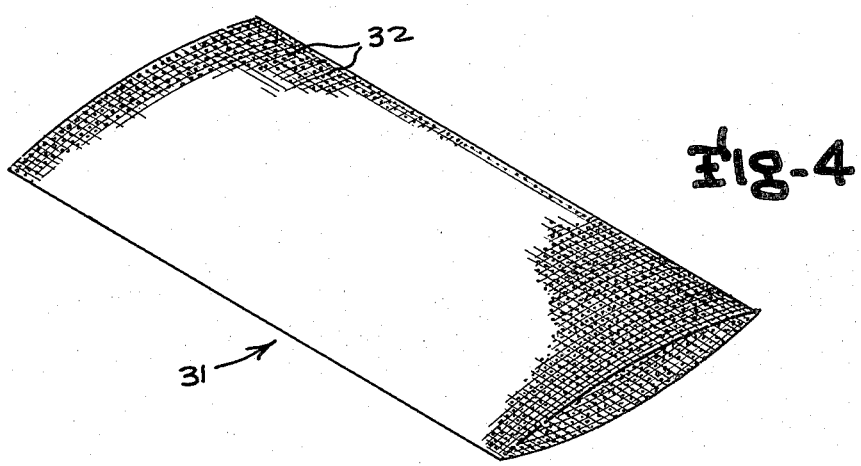

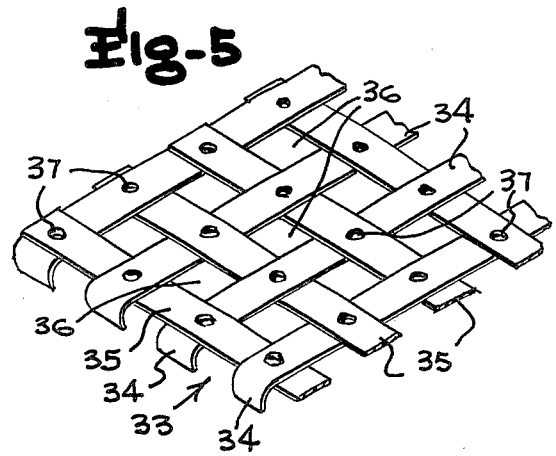
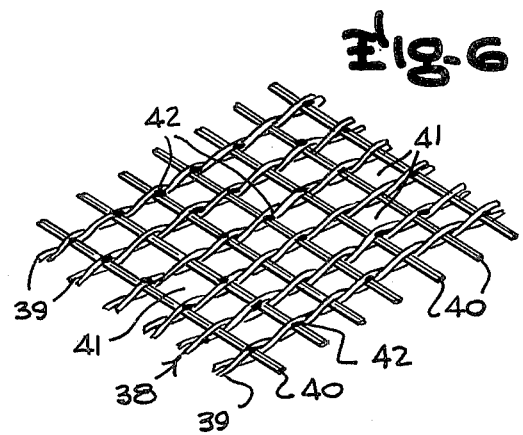
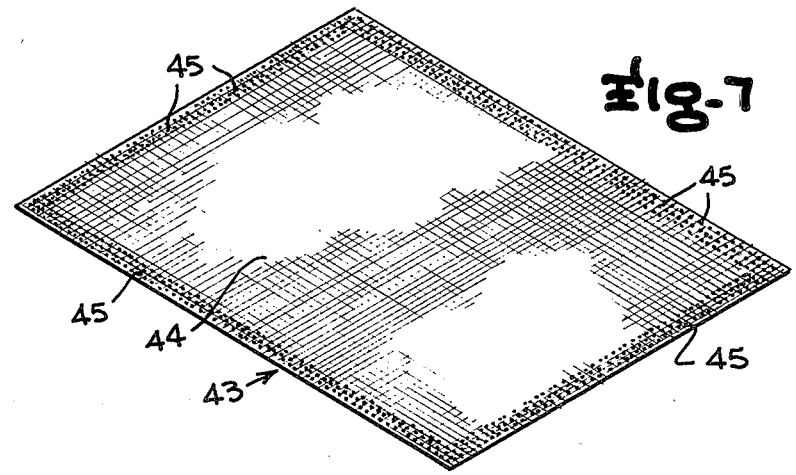
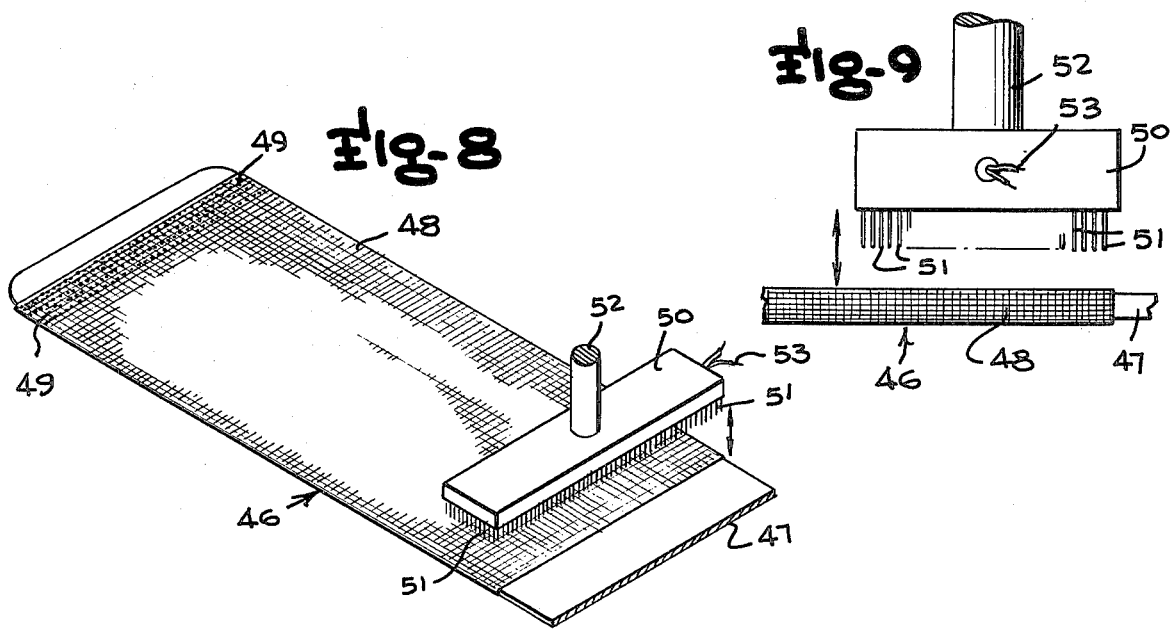
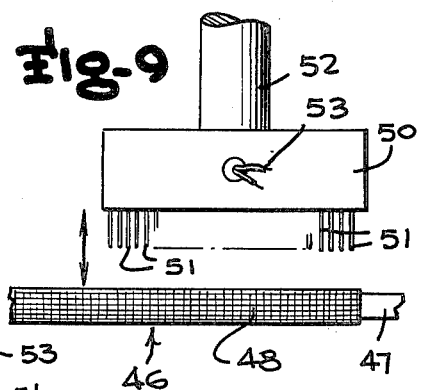

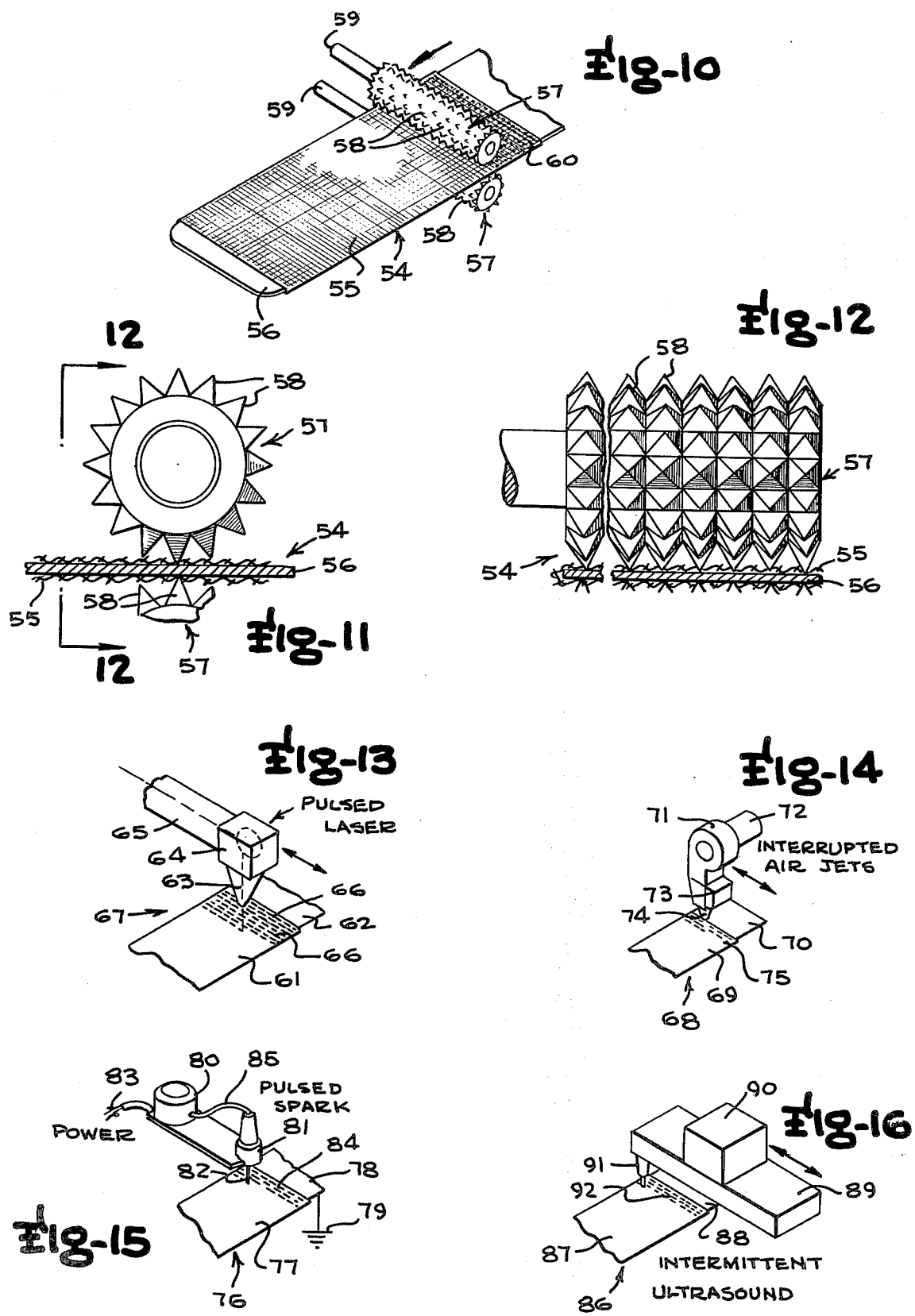

DOT HEAT STAPLING

DESCRIPTION OF THE PRIOR ART

Previously, the various types of stapling and sealing have been provided as, for example, shown in prior U.S. Pat. Nos. 3,249,129; 3,440,117; 3,937,860; 4,202,721; 4,242,166; 4,247,345; 4,281,785. However, neither these prior patents nor any others known to the applicants achieve or accomplish the advantages provided by the present invention.

BACKGROUND AND SUMMARY OF THE INVENTION

In accordance with the present invention there is provided dot heat stapling wherein woven plastic tape or polypropolene or other plastic materials are stapled or joined so that various types of articles such as porous bags can be provided as for example when such bags are to be used in conjunction with heavy citrus, vegetable, and other materials.

An object of the present invention is to provide dot heat stapling wherein the plastic interwoven strips can be stapled together in any suitable manner as for example by means of heated, pointed elements. In another form of the invention, the dot heat stapling can be accomplished by utilizing co-acting rollers with heated points or prongs.

A still further object of the present invention is to provide a dot heat stapling that can be accomplished by a pulsed laser arrangement, interrupted air jets, a pulsed spark arrangement, intermittent ultrasonics and the like.

A still further object of the present invention is to provide dot heat stapling wherein the crossing points of tape type fabrics are attached by means of dot sealing or dot hole edge sealing by any means that will accomplish this purpose. For example, heating needles, wires, combs, pyramids, lasers, ultrasonics, and the like may be utilized.

Still another object of the present invention is to provide dot heat stapling that utilizes molecular joining by melting and mixing the dot or small needle hole environs together, and wherein the material itself is used to melt a dot or small circle of material together.

Still another object of the present object is to provide dot heat stapling that utilizes dot or needle punch welding of thermoplastic material which is a necessary limitation to the fast melting of tape like woven materials, and wherein no sealing enhancing additives are used, and an important aspect or feature of the present invention is the small area exposed to being raised to molten levels that weld the two tapes together, wherein there is so little heat energy that it is immediately dissipated in the adjoining materials and air.

Still another object of the present invention is a method and means utilizing dot heat stapling which does not require or utilize sewing or the use of a middle thermoplastic layer, and wherein with the present invention heat is used to weld the layers together so that a highly efficient and inexpensive method and means is provided, and wherein the dot weld system does not require extremely narrow ranges of heat temperature control in the utilization of the same.

A still further object of the present invention is to provide dot heat stapling that is ruggedly constructed and efficient to use and which is relatively simple and inexpensive to manufacture and to utilize.

Still another object of the present invention is to provide dot heat stapling which can be inexpensively and conveniently and efficiently utilized.

These and other objects of the present invention will be apparent to those skilled in the art in which this invention pertains, and considering the following detailed description of the drawings.

DETAILED DESCRIPTION OF THE DRAWINGS

FIG. 1A is a view illustrating the prior art and showing a portion of the bag separating, or unraveling.

FIG. 1B is a fragmentary perspective view illustrating certain constructional details of the prior art.

FIG. 2A is a view illustrating a bag construction with dot heat stapling according to the present invention.

FIG. 2B is a fragmentary perspective of the bag or article of FIG. 2A.

FIG. 3 is a sectional view taken on the line 3—3 of FIG. 2B.

FIG. 4 is a perspective view illustrating a bag similar to FIG. 2A, but showing the entire surface spot heat sealed or dot heat stapled.

FIG. 5 is a fragmentary perspective view illustrating a modification and illustrating an open weave.

FIG. 6 is a fragmentary perspective view illustrating a further modification and showing a knit-type arrangement.

FIG. 7 is a perspective illustrating a member that had been dot heat stapled on all four edges.

FIG. 8 is a perspective view illustrating one method of dot stapling using heating tines.

FIG. 9 is a side elevational view of the arrangement of FIG. 8.

FIG. 10 is a fragmentary perspective view of a further modification of dot heat stapling using rollers having heated sharp points.

FIG. 11 is a side elevational view of the construction of FIG. 10.

FIG. 12 is an elevational view taken generally on the line 12—2 of FIG. 11.

FIG. 13 is a fragmentary view similar to FIG. 13 but illustrating a further modification showing interrupted heated air jets.

FIG. 14 is a view similar to FIG. 13 but illustrating a further modification showing interrupted heated air jets.

FIG. 15 is a view illustrating a further modification and showing a pulsed electric spark for providing the dot heat stapling.

FIG. 16 is a view illustrating a further modification showing an intermittent ultrasound or ultrasonic arrangement.

DESCRIPTION OF THE PREFERRED EMBODIMENT

Referring in detail to the drawings, and more particularly to FIGS. 1A and 1B of the drawings there is illustrated a prior art device wherein a bag 20 is adapted to be made of woven plastic material 21 and in the such prior art devices 20 portions or selvage portions 22 have a tendency to unravel or come loose at the end thereof as well as the portions indicated by the numeral 23 FIG. 1A. In FIG. 1B which illustrates an enlarged portion of the device in FIG. 1A the plastic strips that are interwoven and are arranged at right angles with respect to each other are indicated by the numerals 24 and 25.

Attention is directed to FIGS. 2A, 2B, and FIG. 3 wherein there is illustrated a bag or article 26 that is adapted to be made in accordance with the present invention and in FIGS. 2A, 2B, 3, portions of the bag 26 are dot heat stapled as at 27 so as to prevent unraveling of the strands of strips 28 and 29. In FIGS. 2B and 3, the numeral 30 indicates apertures which are formed in any suitable manner for example by means of methods or apparatus illustrated later in this patent application, and for example by providing the apertures or openings 30 which define the dot heat stapling points, the warp and weft are stapled together in the desired manner.

Referring now to FIG. 4 of the drawings there is illustrated an article or bag 31 made in accordance with the present invention wherein dot heat stapling 32 is utilized throughout substantially the entire surface of the member 31 to secure the woven plastic strips together.

Attention is directed to FIG. 5 of the drawings wherein there is illustrated a portion of a further modified article 33 which consists of interwoven plastic strips 34 and 35 that are arranged at right angles with respect to each other and in FIG. 5 there is provided open spaces 36 between the strips as when for example it is desired to provide a porous bag for holding citrus fruits, vegetables such as onions and the like wherein by providing such open spaces 36 the likelihood of spoilage will be minimized. In FIG. 5 numeral 37 indicates the dot heat stapling that is used for securing together the plastic strip 34 and 35.

Referring now to FIG. 6 of the drawings the numeral 38 indicates a portion of the knit fabric which consists of portions 39 and 40 that are arranged at right angles with respect to each other, and open spaces 41 are provided between the portions 39 and 40 as for example when it desired to provide a porous bag. In FIG. 6 the numeral 42 indicates the dot heat stapling that is used for sealing the plastic portions 39 and 40 together.

Referring now to FIG. 7 of the drawings the numeral 43 indicates a piece of fabric-like material which includes a main body portion 44 that has all of its side edges 45 provided with dot heat stapling.

Attention is directed to FIGS. 8 and 9 of the drawings wherein the numeral 46 indicates an article or method operated in accordance with the present invention and in FIGS. 8 and 9 a sleeve-like member 48 made of woven plastic which can be mounted on a support member 47, and portions of the member 48 may be dot heat stapled as in 49. In FIGS. 8 and 9 this can be accomplished by providing a plurality of spaced parallel heated tines or prongs or fingers 51 which can be suitably mounted in a head 50 and the head 50 may be operatably connected to a reciprocating plunger or post 52. The head 50 can be suitably operably connected to a suitable source of electrical energy by means of wires 53.

Referring now to FIGS. 10 and 11 of the drawings there is illustrated a further method and means for accomplishing the dot heat stapling wherein the numeral 54 indicates an arrangement consisting of a plastic woven and sleeve-like member 55 that is mounted on a support member 56, and there is provided a pair of co-acting heated rollers 57. Each of the rollers 57 have a plurality of heated sharp points 58 which form the dot heat stapling 50 in the member 55. The pair of rollers 57 are adapted to be rotated or actuated by suitable shafts 59 to be driven or operated in any suitable manner.

Attention is directed to FIG. 13 of the drawings wherein numeral 67 indicates an arrangement using a pulsed laser and in FIG. 13 the numeral 61 indicates a plastic sleeve-like member of body member that is mounted on a support member 62, and the pulsed laser can be accomplished through a cone 63 that is supported from an element 64 to which is attached a conventional tube-like member 65 whereby the pulsed laser effect can be used to provide the dot heat stapling 66 on the woven bag or member 61.

Referring now to FIG. 14 of the drawings the number 68 indicates an arrangement utilizing interrupted heated air jets, and in FIG. 14, a sleeve-like plastic member 69 is mounted on a support member 70, and a blower 71 receives the hot air from a suitable source of supply through a conduit or the like 72. A circuit breaker 73 is provided for interrupting the air jets that are directed onto the plastic member 69 through a cone-like member 74, and in FIG. 14 the numeral 75 indicates the dot heat stapling formed by the interrupted hot air jets that are provided.

Referring now to FIG. 15 of the drawings the numeral 76 indicates an arrangement that utilizes a pulsed spark, and in FIG. 15 the numeral 77 indicates a sleeve-like plastic member that is mounted on a support member 78, and the arrangement of FIG. 15 can be grounded as in 79. Also in FIG. 15 the numeral 80 indicates a control member which is electrically connected as at 85 to a spark plug 81, and a point 82 on the spark plug 81, provides the pulsed sparks for forming the dot heat stapling 84. Power for operating the arrangement of FIG. 15 can be supplied from a suitable source of electrical energy by means of the cables or wires 83.

Attention is now directed to FIG. 16 of the drawings wherein there is illustrated an arrangement 86 that utilizes intermittent ultra-sound or ultra-sonics, and in FIG. 16 a plastic sleeve-like member 87 is mounted on a support member 88, and the element 89 is adapted to reciprocate back and forth in the direction of the arrows. A suitable control member 90 is mounted on the element 89, and a cone-like element 91 provides the intermittent ultra-sonics on the plastic sleeve-like member 87 so as to provide the dot heat stapling 92.

From the foregoing, it will be seen there has been provided dot heat stapling, and in use with the parts arranged as shown in the drawings, the dot heat stapling is especially suitable for use in welding or connecting together the warp and weft of plastic bags that can be used for any desired purpose. Attention is directed to FIGS. 1A and 1B wherein there is illustrated diagrammatically the prior art devices indicated by the numeral 20 and in FIGS. 1A and 1B the woven plastic strips 24 and 25 have a tendency to separate so as to provide loose edge portions 22, 23 and the like and this is disadvantageous when using the bags for various types of articles. In the present invention such disadvantages are overcome.

Attention is directed to FIGS. 2A, 2B, and FIG. 3 wherein there is illustrated one mode or method of overcoming the disadvantages of the prior art methods or devices. Thus, in FIGS. 2A, 2B and FIG. 3 the numeral 26 indicates a bag that can be used for any desired purpose, wherein the upper and lower ends may be treated with the dot heat stapling as at 27 so as to prevent unraveling or unwinding as previously illustrated with parts 22 and 25. In FIG. 2B there is illustrated woven plastic strips 28 and 29 which are in the form of a warp and weft, and at cross points in these plastic strips 28 and 29 dot heat stapling 30 is provided. The dot heat stapling 30 may be in the form of apertures or openings that are formed by one of the various methods described in the present application. By providing the dot heat stapling 30, in effect a welded juncture or joint is provided between the intersected or woven plastic strips 28 and 29 so that these plastic strips will not become unraveled.

Attention is directed to FIG. 4 of the drawings wherein the numeral 31 is a view generally similar to FIG. 2A but showing the entire surface of the article or bag or sleeve 31 provided with dot heat stapling 32, rather than just having the upper and lower edge portions 27 dot heat stapled.

Attention is directed to FIG. 5 of the drawings wherein there is shown a portion of an article 33 which has an open weave construction which is made from intersecting or woven strips 34 and 35 in the form of a warp or woof or weft, and between the plastic strips 34 and 35 there is open spaces 36. Thus, with the arrangement of FIG. 5 there is a porous construction provided due to the provisions of the spaces 36 so that articles such as potatoes or onions or any other vegetable or product in a bag made with the article 33 can have air enter or leave the bag whereby spoilage of products within the bag will be minimized. In FIG. 5 suitable dot heat stapling 37 is provided by any suitable means and the effect of the dot heat stapling 37 is to effectively seal or join the plastic strips 34 and 35 together.

Referring to FIG. 6 of the drawings there is illustrated an open knit type of fabric which is also dot heat stapled so that the plastic warp and woof are joined together as at 42. In FIG. 6 the numeral 38 indicates a portion of the article which consists of elements made of plastic or the like 39 and 40 which are knitted or woven together and wherein there is also provided the open spaces 41 so that a porous type bag can be made for the same purpose as the previously described article of FIG. 5. In FIG. 6 the numeral 42 indicates the dot heat stapling which is accomplished at the juncture 39 and 40 so as to join the portions 39 and 40 together whereby these portions or elements will not unravel or unwind.

Referring now to FIG. 7 there is illustrated a section of fabric 43 that can be used for any desired purpose. The member 43 of FIG. 7 includes a main body portion 44 which has all its outer edges 45 provided with the dot heat stapling so that unraveling of the edges of the member 43 will be prevented.

Referring to FIGS. 8 and 9 of the drawings there is illustrated in detail one method of accomplishing the dot heat stapling. Thus, in FIGS. 8 and 9 a sleeve-like member 48 made of plastic is mounted on a suitable support member 47, and the heated tines or needles 51 are adapted to move up and down or be reciprocated in any suitable manner in the direction of the arrows so that the dot heat stapling 49 is provided in the sleeve 48. The head or block 50 is adapted to be connected to suitable sources of electrical energy whereby the tines or fingers 51 can be heated, and the shaft or plunger 52 can be actuated in a suitable manner to cause the heated tines 51 to move into and out of engagement with the plastic sleeve 48 to provide the dot heat stapling 49. After the dot heat stapling 49 has been provided in member or article 48, the article 48 can be removed from the support member 47 whereby a completed bag or other member can be formed which can be used for any desired purpose.

Attention is now directed to FIGS. 10, 11, and 12 of the drawings wherein a pair of heated rollers 57 are utilized to provide dot heat stapling 60 in a plastic sleeve-like member 55 that can be mounted on a support member 56. The pair of cooperating rollers 57 are each provided with heated prongs or points 58, and the rollers 58 can be turned or actuated by shafts 59 which can be rotated in any suitable manner. As the rollers or drums 57 rotate, the staggered spaced apart heated prongs 58 cause the dot heat stapling 60 to be formed in the sleeve 55 to accomplish the desired purpose.

Referring now to FIG. 13 of the drawings there is illustrated a further alternative or modified method of providing the dot heat stapling such as the dot heat stapling 66. In FIG. 13 a pulsed laser 64 of conventional structure can be provided with a cone-like member 63 which can receive laser energy from a tube-like member 65, and the element 63 will provide dot heat stapling 66 in a plastic sleeve or article 61.

In FIG. 14 there is illustrated a further modified form of the invention which uses interrupted heat and air jets to form the dot heat stapling 75. In FIG. 14 hot air can be supplied from a suitable source of supply through the tube 72 to a blower or fan 71 and a suitable control or element 73 is provided for providing interrupted hot air jets through a nozzle or cone 74 onto the plastic member 69 so as to provide the dot heat stapling 75.

In FIG. 15 there is illustrated a pulsed spark arrangement wherein a spark plug 81 is electrically connected as at 85 to a control unit 80 which can receive electrical power from a power source through the wires 83, and the pulsed spark from the element 82 forms the dot heat stapling 84 on the plastic article 87. The article 87 can be supported in any suitable manner, and for example the article 87 can be supported on the member 78.

In FIG. 16 there is illustrated a method of using intermittent ultra-sounds or ultra-sonics wherein the support piece 89 is adapted to be reciprocated in the direction of the arrows so that the ultrasonic energy or intermittent ultrasound is discharged through the tip 91 onto the plastic article 87 to form dot heat stapling 92.

In FIG. 14 the interrupted heated air jets arrangement is adapted to move in the direction of the arrows, and in FIG. 13 the pulsed laser also is adapted to be moved in any suitable manner in the direction of the arrows.

The parts can be made of any suitable material and in different shapes or sizes as desired or required.

With the present invention there is provided woven plastic tapes of polypropylene or other plastics as well as methods for stabilizing the edge portions of such plastics. As is known the weaving of tape type of fabrics goes back into antiquity; to almost the beginnings of mankind efforts to utilize slices or pieces of readily available vegetation to make baskets for holding or transporting food or other substances were undertaken. A major advantage of weaving with tape was the speed at which large woven areas can be produced and still maintain high strength. Speed of weaving is still the greatest asset of tape construction. Two areas that result in difficulty utilizing tape construction are locking the edge in place to prevent unraveling and making open or screen-like porous constructions. The former process is referred to as selvage which is presently accomplished in several ways such as knotting, covering and attaching flexible and heavy strips by making and inserting other tapes and materials to stiffen and stabilize the outer perimeter. All of these methods require much labor and are time-consuming.

The problem of creating porous tape construction has been historically solved by weaving stiff tape in the main. Another method of stabilizing open weaving is by dipping and drying the cloth in a glue bath that locks cross points together although this process is relatively expensive relative to materials used and in large volume costly machinery and ovens are necessary. In order to make open porous material such as used for holding heavy citrus materials such as grapefruit, oranges, and the like, as well as vegetable bags and other such articles to be transported, string type constructions are presented used in a process of knitting or a double yarn in one direction locking a single yarn at 90 degrees. As far as is known no process has been economically adapted to utilize the soft tape construction for open mesh weaving.

An economic answer to the difficulties is solved when weaving polypropylene tape, and the most common plastic that is now used for most commodity bags as well as for chemical, foodstuffs, and the like is by heat sealing through the use of small dots or punctures. By the use of long bars or rolls of heated needles or whiskers the edges of the firmer woven plastic tape cloth can be locked together so the edges will not fray and thereby contaminate the material shipped within the bag so that in the case of animal feed, for example, an indigestible ball of fiber will not come loose to sicken or kill the animal.

Further, when porosity is a requirement of cloth such as with citrus fruits, the simplest method of weaving flat tapes that stay locked in position is now possible with the present invention. Using flat tape for this purpose as well as for other vegetables, also eliminates rope-like indentations on the produce or other articles.

Thus, the point heat sealing or puncturing of crossover points in woven plastic tape fabric is particularly important to problems in using polypropylene because this material does not easily heat weld at high speed where it will weld together with needle poking very readily or efficiently.

In addition this method of stabilizing thermoplastic tape materials will permit commercial bags to be reused many more times, for instance in the transportation of animal feeds such as soy beans, alfalfa, corn, and the like. The present method of cold cutting the edge or the slower method of heat cutting the edge are poor and unsatisfactory answers to the problem of fraying. Heat sealing does not lock the end fibers permanently together and usually only one trip may be made before fraying and contamination take place. In economic reality this results in a cost of approximately 35 cents per bag making only one trip whereas it should make an average of five trips and thereby reduce the cost to approximately 7 cents per trip. Typically 20 to 40 bags are used per ton of feed with subsequent consumer saving of 28 cents per trip and $5.60 to $11.20 per ton which, when considered in relation to the millions of tons transported in bags, results in very large savings both in dollars and also in finite oil-based material resources. This method of selvage stabilization also reduces or eliminates plastic contamination of bale cover products such as cotton and synthetic fibers.

With regard to the stabilization of open porous materials, the higher production that is possible by utilizing new circular high speed looms becomes feasible because for the first time there is a significant lowering of the price of mesh potato bags, scrim support materials and the like. The dot method of sealing or puncturing weld points eliminates the problems posed by thermoplastic memory whereby the plastic tends to shrink back to a previous shape. In order to overcome this property, chilling while holding in position must take place with its inherent cost in speed and capital equipment. In addition the scrambling of molecules from unidirectional change is now made possible as occurs when sealing the entire surfaces and thereby weakening the material tape strength. As a result of this method of stabilizing tape cloth, new areas of business will emerge with the savings of much material and greater consumer gratification.

With further regard to the whisker weld of the present invention, whisker welding may be used by just poking or heating holes through the layers or touch sealing one tape to its crossing tape at random or at different patterns. These variables depend on appearance and stability considerations which result in variable machine and production costs.

A big problem has been in connection with woven bags and the like when such bags are used for food or other edible products that when such bags are made of strips of plastic material which are woven the strips have a tendency to unravel or come loose, as shown in FIG. 1A and FIG. 1B. With the present invention such unraveling is prevented. Thus in FIGS. 1A and 1B, portions such as the portions 22 and 23 have a tendency to break off and may be swallowed by animals which consume feed or the like in bags, like the bags 20. In FIGS. 2A, 2B, and FIG. 3, the small holes 30 may be made by heating wires such as the heated wires 51, or they may be made by the heated points 58, or by the methods shown in FIGS. 13, 14, 15, or 16. FIG. 5 illustrates generally wide strips of plastic, 34 and 35, being utilized, and wherein a porous construction is provided with the open spaces 36. FIG. 6 illustrates a porous construction form utilizing criss-cross or woven plastic elements 39 and 40 so that FIG. 6 utilizes narrow strips rather than the wide strips of FIG. 5. With the construction of FIGS. 5 and 6, various products such as onions or other food products can be stored in bags made in accordance therewith so that air can circulate in and out of the bags without causing premature spoilage of products within the bags. In FIG. 6 a knitted fabric arrangement is provided so that the parts will not tear apart due to the provision of the dot heat stapling 42.

FIG. 7 illustrates a flat article 43 which can be sealed on all four edges as in 45 and the user can make any desired article out of such a member 43. With the dot heat stapling 45 on the article 43 in FIG. 7, the plastic strips will not separate or come apart.

FIGS. 8 and 9 illustrate the method of accomplishing the present invention wherein the heated wires or elements 51 are caused to be moved in the direction of the arrow so that the dot heat stapling 49 is provided in the plastic article 48. FIGS. 10, 11, and 12 indicate two rollers that are heated in any suitable manner whereby the prongs 58 on the roller 57 will cause the dot heat stapling 50 to be formed.

In FIG. 13 the pulsed laser moves back and forth in the direction of the arrow to provide the dot heat stapling 55, and in FIG. 14 the interrupted air jets also move back and forth in the direction of the arrows to form the dot heat stapling 75. In FIG. 15 the dot heat stapling 84 is formed by a pulsed spark arrangement, and in FIG. 16 intermittent ultrasonics is reciprocated in the direction of the arrows to form the dot heat stapling 92.

It will be seen that there has been provided a method and means for making a variety of woven bags of synthetic material such as synthetic plastic. Some of the advantages or purposes of the present inventions are as follows: contamination is prevented, animals consuming or eating feed from bags formed in accordance with the present invention will not end up with balls of plastic in their stomachs due to unraveling of string or plastic or tape material. There results a product which is approximately ten percent cheaper to make because less sewing is needed for certain bags. Further, bags in accordance with the present invention can be used approximately seven to ten times as often as other bags which can only be used generally two or three times for ordinary woven bags.

The bags that are made can be punched or sealed at the top, bottom, or on all sides or they can be made from within the middle to all sides. Further, there is provided welded material which is not even visible.

As previously noted, the intersections can be sealed with heated tines or rollers or plates as well as with lasers, heated air jets, electric arcs, ultrasonics and the like. Rollers, such as the rollers 57, may be heated to approximately 700°.

The arrangement shown in FIGS. 10, 11, and 12 consists of a pair of coacting rollers which may have pyramid-shaped prongs or points 58 for accomplishing the hot-welded edges.

The present invention prevents shredding of the parts. With the present invention, the edges or other parts are welded together by heat and the like so that dot heat stapling is provided. The present invention is especially suitable for use on the top of bags and spot welding is accomplished.

In accordance with the present invention there is provided methods and means of manufacturing package material wherein a matrix of tapes are formed into a structure such as a woven structure of plastic tapes. Energy is applied to intersections of the plastic tapes to form an array of sufficient magnitude to form a fracture juncture and integral construction. With the present invention dot heat sealing is utilized to accomplish the present results.

The present invention possesses certain important differences and advantages not found in the prior patents. For example, in prior U.S. Pat. No. 3,440,117, this patent refers to using only sonic energy to attach thermoplastic to itself and other substances together. In applicants' invention there is attachment of the crossing points of taped type fabrics together with dot sealing or dot hole edge sealing by any means that will cause this function to occur. These functions or means may consist of heated needles, wires, cones, lasers, ultrasonics or other means.

In prior U.S. Pat. No. 3,257,264, there is mechanical cold needle entangling of fibers, not molecular joining by melting and mixing the dot or small needle hole environs together.

Attention is directed to prior U.S. Pat. No. 4,281,785 and this patent refers to a method of stapling using a plastic fusable staple. Applicants use the material itself to melt a dot or small circle of material together.

Attention is directed to prior U.S. Pat. No. 3,249,129, and this prior patent does not refer to the dot or needle punch welding of thermoplastic material which is a necessary limitation to the fast welding of tape-like woven materials to eliminate: (a) the contraction of a thermoplastic material to its former shape by only heating minute areas. (b) eliminating the necessary clamped in position cooling that takes considerable time that is necessary to eliminate dimensional distortion. In addition, applicants' invention set forth herein does not call for sealing enhancing additives, or for the use of high frequency welders since normal resistance heating can be the heat source besides other exotic or high technology sources such as lasers. The important part of applicants' invention is the small area exposed to being raised to molten levels that weld the two tapes together has so little heat energy that it is immediately dissipated in the adjoining materials and air.

Referring to prior U.S. Pat. No. 4,247,345, there is a method of joining two layers of synthetic materials that necessitates the use of a thermoplastic bonding layer held in position by a sewing thread and then post heated to glue the outer surfaces together. Applicants' invention entails no sewing nor the use of a middle thermoplastic layer.

In referring to prior U.S. Pat. No. 3,937,860, this patent again uses cold needles to entangle fibers of material together, whereas, applicants use heat to weld layers together.

In referring to prior U.S. Pat. No. 4,202,721, this patent uses an electrically heated flat tape to melt a thermoplastic material together and does not refer to any dot system of welding, and it would be enormously costly and the results probably would not be as good as dot welding.

In prior U.S. Pat. No. 4,242,166, the dot weld system does not necessitate extremely narrow ranges of heat temperature control such as applicants' invention attempts to control.

While several embodiments of the present invention have been illustrated herein in particular detail, it will be understood that variations and modifications may be effected without departing from the spirit and scope of the novel concepts of this invention.

What is claimed and desired to be secured by Letters Patent of the United States is:

1. In dot heat stapling apparatus for forming interwoven plastic material and preventing unraveling thereof as well as providing an economic manufacture of packaging material, the apparatus comprising means for applying energy to a woven sleeve-like member of thermoplastic sensitive tapes responsive to deformation accorded by application of said energy so that a weldment is formed interconnecting proximate midpoints of intersecting tapes, said means for applying energy including a support member for receiving said woven sleeve-like member thereon and a pair of co-acting heated rollers, each of said rollers having a plurality of staggered, spaced apart heated prongs having a pyramidal shape, which forms dot heat stapling in the woven sleeve-like member, shafts for rotating said rollers, said rollers being positioned on opposite sides of said support member, and wherein as the rollers rotate, the pyramidal shaped heated prongs cause the dot heat stapling to be formed in the woven plastic sleeve-like member received on said support member.

* * * * *